US012305793B2

(12) United States Patent
Lee

(10) Patent No.: US 12,305,793 B2
(45) Date of Patent: May 20, 2025

(54) UNIVERSAL PLATFORM

(71) Applicant: Sercomm Corporation, Taipei (TW)

(72) Inventor: Rong Tang Lee, Taipei (TW)

(73) Assignee: Sercomm Corporation, Taipei (TW)

( * ) Notice: Subject to any disclaimer, the term of this patent is extended or adjusted under 35 U.S.C. 154(b) by 0 days.

(21) Appl. No.: 18/453,330

(22) Filed: Aug. 22, 2023

(65) Prior Publication Data
US 2024/0084955 A1 Mar. 14, 2024

(30) Foreign Application Priority Data

Sep. 8, 2022 (CN) .......................... 202211096846.0

(51) Int. Cl.
F16M 11/14 (2006.01)
F16M 11/04 (2006.01)
F16M 11/22 (2006.01)
(52) U.S. Cl.
CPC .......... *F16M 11/14* (2013.01); *F16M 11/041* (2013.01); *F16M 11/22* (2013.01)
(58) Field of Classification Search
CPC ...... F16M 11/14; F16M 11/041; F16M 11/22; F16M 2200/022; F16M 11/16; F16M 13/022
See application file for complete search history.

(56) References Cited

U.S. PATENT DOCUMENTS

| | | | |
|---|---|---|---|
| 2007/0170328 A1 | 7/2007 | Fortes et al. | |
| 2010/0078537 A1* | 4/2010 | Chen | B62J 11/00 248/276.1 |
| 2010/0282930 A1 | 11/2010 | Hsu | |
| 2011/0070019 A1* | 3/2011 | Song | B25J 17/0275 403/220 |
| 2012/0248166 A1* | 10/2012 | Gold | F16M 13/022 248/636 |
| 2013/0299652 A1* | 11/2013 | Graham | F16M 11/14 248/309.3 |
| 2020/0309312 A1 | 10/2020 | Ye | |

FOREIGN PATENT DOCUMENTS

CN 111350788 A * 6/2020

OTHER PUBLICATIONS

"Search Report of Europe Counterpart Application", issued on Feb. 2, 2024, p. 1-p. 6.

* cited by examiner

*Primary Examiner* — Bradley Duckworth
(74) *Attorney, Agent, or Firm* — JCIPRNET

(57) ABSTRACT

The disclosure provides a universal platform including a bottom base, an upper cover, a fixed base, a rotating base, at least one locking member, and at least one elastic member. The upper cover is disposed on the bottom base and has a through hole. The fixed base is disposed between the upper cover and has a concave. The concave is aligned to the through hole to form a receiving space. The rotating base is disposed in the receiving space and partially protrudes outside of the through hole. The at least one locking member is connected to the upper cover through the fixed base. The at least one elastic member is disposed between the fixed base and the at least one locking member.

8 Claims, 5 Drawing Sheets

UNIVERSAL PLATFORM

CROSS-REFERENCE TO RELATED APPLICATION

This application claims the priority benefit of China application serial no. 202211096846.0, filed on Sep. 8, 2022. The entirety of the above-mentioned patent application is hereby incorporated by reference herein and made a part of this specification.

BACKGROUND

Technical Field

The disclosure relates to a universal platform, and in particular, to a universal platform capable of compensating a clamping force.

Description of Related Art

Universal platforms are often used in electronic products such as photographic lenses, sensors, lighting devices, or smart phones, and are suitable for adjusting the placement angle of the electronic products. An existing universal platform includes a bottom base and a rotating base, and an end of the rotating base adopts a ball head. The rotating base is installed in the bottom base. The rotating base can carry electronic products and rotate relative to the bottom base through the ball head so as to adjust to the required direction and angle.

The sizes of the bottom base and the ball head are matched to each other so as to maintain the free rotation of the ball head in the state where the ball head is clamped and locate the ball head at an appropriate position or angle. However, the environmental temperature variations or the aging of the universal platforms may cause loosening between the bottom base and the ball head, thereby causing the ball head to be unable to be maintained at a specific position or angle. The problem is especially serious for the universal platforms made of plastic materials. The existing solution is to increase the clamping force of the bottom base on the ball head. Hopefully, after the clamping force of the bottom base declines due to the aging of the material, the clamping force can still be maintained within an acceptable range. However, the requirement on the size accuracy of the bottom base is extremely high and precise manufacturing is required to achieve the required size accuracy of the bottom base, which will increase the labor cost and decrease the yield. In addition, if a locking method such as a screw is used to increase the clamping force of the bottom base on the ball head, the excess driving force on the screw during the locking process can easily damage the thread of the screw, the needle of the head of the screw, the locking part of the bottom base, etc. If the clamping force between the bottom base and the ball head is insufficient, the ball head cannot be positioned at an appropriate position or angle and cannot operate normally. In other cases, a filling element may be disposed between the ball head and the bottom base to increase the clamping force between the bottom base and the ball head, but after a prolonged period of use and aging, the loosening between the bottom base and the ball head is still inevitable, thereby causing the ball head to be unable to be maintained at a specific position or angle.

SUMMARY

The disclosure provides a universal platform, which is adapted to electronic equipment. Through an elastic force provided by an elastic member, a fixed base is pressed against a rotating base to stabilize the position and the deflection angle of the rotating base in the fixed base.

A universal platform of the disclosure includes a bottom base, an upper cover, a fixed base, a rotating base, at least one locking member, and at least one elastic member. The upper cover is disposed on the bottom base and has a through hole. The fixed base is disposed between the upper cover and the bottom base, and having a concave aligned to the through hole to form a receiving space. The rotating base is disposed in the receiving space and partially protrudes outside of the through hole. The at least one locking member is connected to the upper cover through the fixed base. The at least one elastic member is disposed between the fixed base and the at least one locking member.

In an embodiment of the disclosure, the above-mentioned rotating base has a ball head. The ball head fits in the receiving space and interferes with at least one of the upper cover and the fixed base and the ball head is adapted to rotate in the receiving space.

In an embodiment of the disclosure, the above-mentioned upper cover has a plurality of positioning posts, and the fixed base has a plurality of positioning holes for respectively accommodating the plurality of positioning posts so that an end of each positioning post protrudes through each of the positioning holes.

In an embodiment of the disclosure, further comprising a plurality of spacers respectively sleeved on the ends of the plurality of positioning posts.

In an embodiment of the disclosure, the above-mentioned at least one locking member includes a plurality of locking members respectively penetrating and connected to the plurality of positioning posts, and a gap is formed between each of the locking members and each of the corresponding spacers.

In an embodiment of the disclosure, the above-mentioned at least one elastic member includes a plurality of elastic members respectively is located in each corresponding gap and pushes against each of the spacers and each of the locking members respectively.

In an embodiment of the disclosure, each of the positioning posts has a thread formed on an inner wall surface of each of the positioning posts, and each of the locking members is engaged with each of the corresponding threads so that a head of each of the locking members is spaced from each of the corresponding positioning posts.

In an embodiment of the disclosure, the above-mentioned plurality of locking members are respectively screwed to the threads of the plurality of positioning posts with one or more preset torque values.

In an embodiment of the disclosure, each of the locking members and each of the corresponding positioning posts are snap-fitted.

Based on the above, the universal platform of the disclosure is adapted to be connected to the electronic equipment. Through the elastic force provided by the elastic member, the fixed base can press the rotating base to stabilize the position and deflection angle of the rotating base in the fixed base. Even if the clamping force of the fixed base declines under the environmental temperature difference and long-term extrusion, the elastic member may compensate for the clamping force lost by the fixed base after the material of the fixed base ages so as to prevent the rotating base from loosening from the fixed base.

In order to make the above-mentioned features and advantages of the disclosure clearer and easier to understand, the following embodiments are given and described in details with accompanying drawings as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain principles of the disclosure.

DESCRIPTION OF THE EMBODIMENTS

Figure 1:
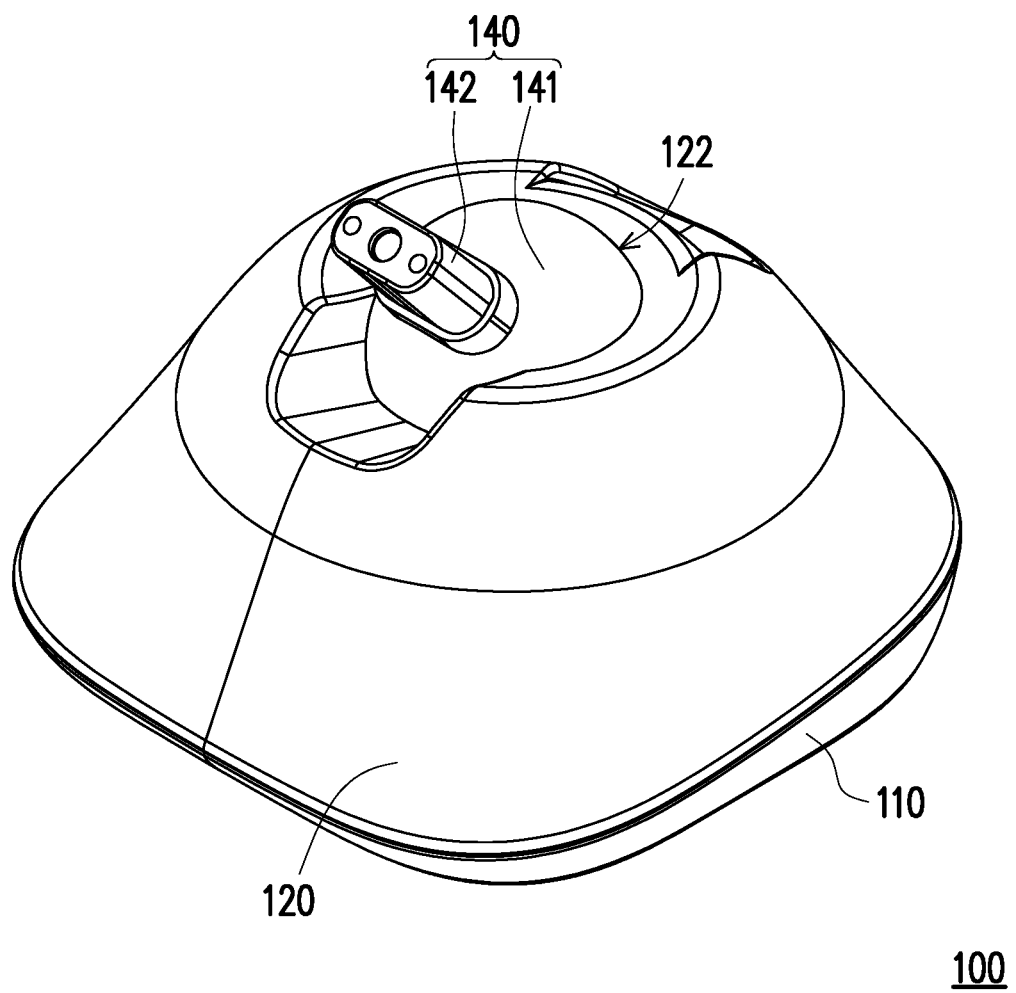
FIG. 1 is a schematic three-dimensional diagram of a universal platform according to the disclosure.

Reference will now be made in detail to the exemplary embodiments of the disclosure, examples of which are illustrated in the accompanying drawings. Wherever possible, the same reference numbers are used in the drawings and description to refer to the same or like parts.

Figure 2:
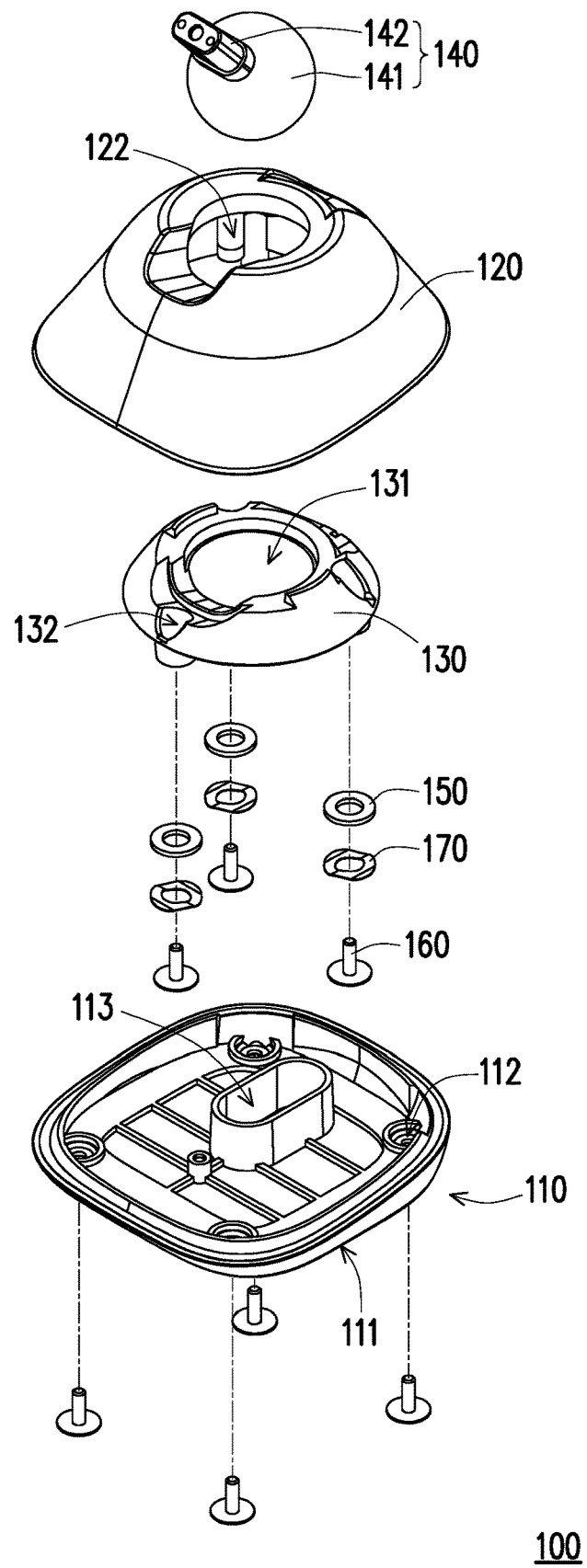
FIG. 2 is a schematic exploded diagram of components of the universal platform of FIG. 1.
Figure 3:
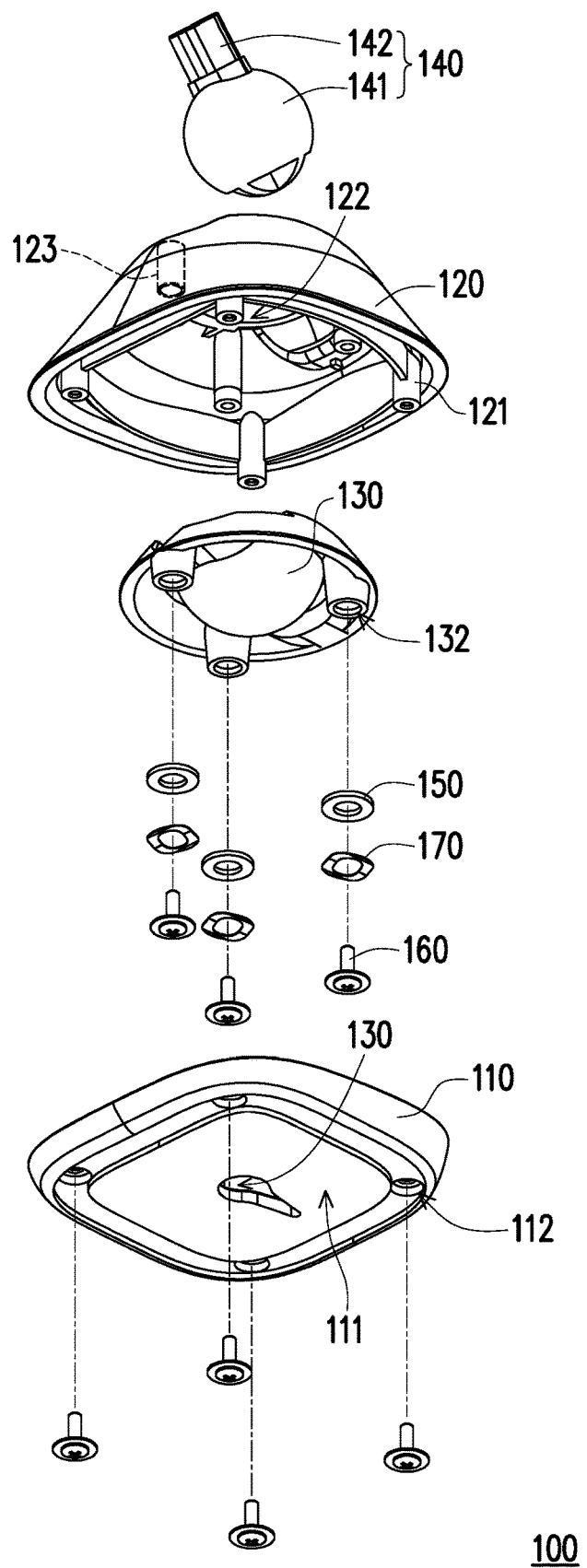
FIG. 3 is a schematic exploded diagram of components of the universal platform of FIG. 1 in another direction.
Figure 4:
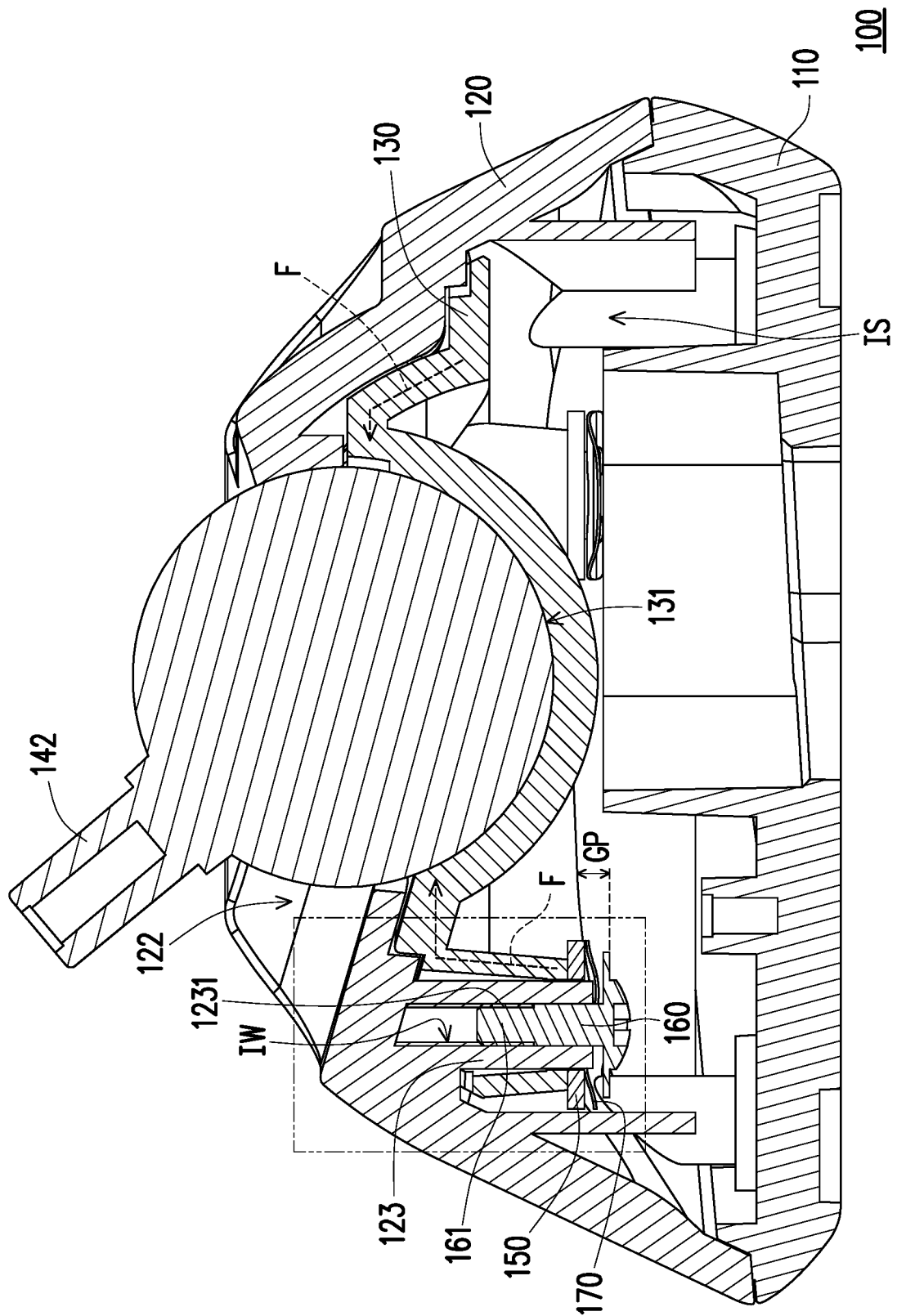
FIG. 4 is a schematic cross-sectional diagram of the universal platform of FIG. 1.
Figure 5:
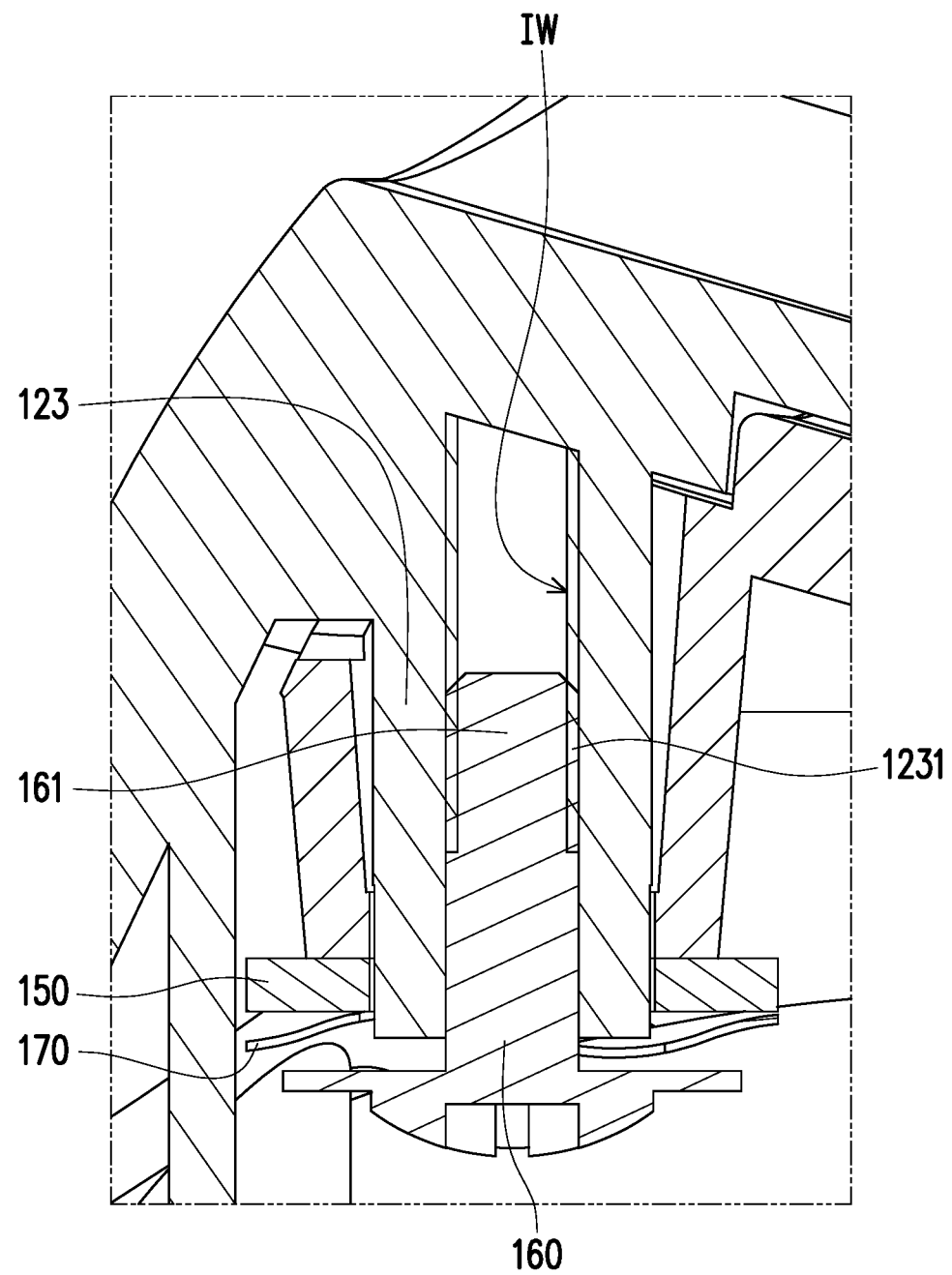
FIG. 5 is an enlarged diagram of some components of the universal platform of FIG. 4.

FIG. 1 is a schematic three-dimensional diagram of a universal platform according to the disclosure. FIG. 2 is a schematic exploded diagram of components of the universal platform of FIG. 1. FIG. 3 is a schematic exploded diagram of components of the universal platform of FIG. 1 in another direction. FIG. 4 is a schematic cross-sectional diagram of the universal platform of FIG. 1. FIG. 5 is an enlarged diagram of some components of the universal platform of FIG. 4.

Referring to FIG. 1, the universal platform of the disclosure may be used in electronic products such as photographic lenses, sensors, lighting devices, or smart phones, and the universal platform is adapted to be fixed on desktops, walls, or other similar flat surfaces. The position and the deflection angle of the aforementioned electronic products may be adjusted by utilizing the universal platform to meet the user's work needs.

Referring to FIGS. 1-4, a universal platform 100 of the disclosure includes a bottom base 110, an upper cover 120, a fixed base 130, a rotating base 140, at least one spacer 150, at least one locking member 160, and at least one elastic member 170.

The bottom base 110 has a substantially square appearance and has a bottom surface 111, a plurality of locking holes 112, and an opening hole 113. The plurality of locking holes 112 are respectively formed through the bottom surface 111 and located at four corners of the bottom base 110. The opening hole 113 is formed through the bottom surface 111 and is respectively spaced from the plurality of locking holes 112.

In addition, the opening hole 113 is used to place the magnetic piece and may be attracted to and attached on the magnetic material, or the opening hole 113 is engaged with a protrusion of a corresponding shape so as to position the bottom base 110 on the desktop, wall, or other similar on flat surface.

The upper cover 120 is disposed on the bottom base 110 and has a plurality of locking posts 121, a through hole 122, and a plurality of positioning posts 123. The plurality of locking posts 121 of the upper cover 120 are aligned to the plurality of locking holes 112 of the bottom base 110, and plurality of screws 124 respectively penetrates through the plurality of locking holes 112 to be screwed to the plurality of locking posts 121. The through hole 122 is situated substantially at the center of the upper cover 120. The plurality of positioning posts 123 locate at the bottom surface of the upper cover 120, surround the through hole 122 and extend toward the bottom base 110.

The fixed base 130 is disposed between the upper cover 120 and the bottom base 110, so the fixed base 130 is located in an inner space IS formed by the upper cover 120 and the bottom base 110. The fixed base 130 has a concave 131 aligned to the through hole 122 of the upper cover 120 to form a receiving space between the upper cover 120 and the fixed base 130. The receiving space is labeled in the figures for clarity, but the position of the receiving space can be easily perceived, e.g., the space occupied by the ball head 141 in FIG. 4.

Referring to FIG. 4, the rotating base 140 is disposed in the receiving space and partially protrudes outside of the through hole 122 of the upper cover 120. The rotating base 140 has a ball head 141 and a plug 142. The ball head 141 fits in the receiving space and interferes with at least one of the upper cover 120 and the fixed base 130 and the ball head 141 is adapted to rotate in the receiving space. The plug 142 is connected the ball head 141. In detail, the concave 131 has an arc-shaped appearance and matches the shape of the ball head 141. Part of the ball head 141 is pressed by the concave 131 and the upper cover 120. Another part of the ball head 141 and the plug 142 protrude out of the through hole 122.

Furthermore, the plug 142 is used to connect the electronic product, so that the electronic product may be integrated with the rotating base 140 to drive the ball head 141 to rotate in receiving space through operating the plug 142 so as to adjust the position and deflection angle of the electronic product on the universal platform 100.

The at least one locking member 160 is connected to the upper cover 120 through the at least one spacer 150 and the fixed base 130. The at least one elastic member 170 is disposed between the at least one spacer 150 and a head of the at least one locking member 160. In the embodiment, the at least one elastic member 170 is an elastic sheet, a spring washer, a compression spring, or rubber, and the at least one elastic member 170 provides an elastic force F to the at least one spacer 150 and the fixed base 130, so that the fixed base 130 clamps part of the ball head 141.

Referring to FIGS. 2-4, the plurality of positioning posts 123 of the upper cover 120 have internal hollow structures. The fixed base 130 has a plurality of positioning holes 132 for respectively accommodating the plurality of positioning posts 123, so that an end of each positioning post 123 protrudes from each positioning hole 132. The fixed base 130 and the upper cover 120 are aligned by engaging the plurality of positioning holes 132 with the plurality of positioning posts 123.

Furthermore, the at least one spacer 150 includes a plurality of spacers respectively sleeved on the ends of the plurality of positioning posts 123 and contacting the fixed base 130. The at least one locking member 160 includes a plurality of locking members penetrating and connected to the plurality of positioning posts 123 respectively, and a gap GP is formed between each of the locking members 160 and each corresponding spacer 150. The at least one elastic member 170 includes a plurality of elastic members respectively located in each corresponding gap GP and pushes against each of the spacers 150 and each of the locking members 160 respectively. The spacer 150 may make the force of the elastic member 170 more even, and the elastic force of the elastic member 170 may be transmitted to the fixed base 130 through the spacer 150 to avoid damage to the fixed base 130. In the embodiment, each of the locking members 160 and each of the positioning posts 123 are snap-fitted.

In another embodiment, the fixed base 130 and the elastic member 170 have enough contact area to evenly transmit the elastic force of the elastic member 170 to the fixed base 130. At this time, the spacer 150 may not be used, but the locking member 160 is directly connected to the positioning post 123, so that the elastic member 170 directly abuts against the fixed base 130.

In the embodiment, the plurality of elastic members 170 are respectively compressed by the fixed base 130 and the plurality of locking members 160 to accumulate the elastic force, and elastic forces F of the plurality of elastic members 170 are transmitted to the fixed base 130 from different positions through the plurality of locking members 160, so that the fixed base 130 presses against and clamps the ball head 141 of the rotating base 140.

In addition, when the clamping force of the fixed base 130 declines under the environmental temperature difference and long-term extrusion, the plurality of elastic members 170 may compensate for the clamping force of the fixed base 130 so as to prevent the ball head 141 of the rotating base 140 from becoming loose in the fixed base 130.

Referring to FIG. 4 and FIG. 5, each of the positioning posts 123 has a thread 1231 formed on an inner wall surface IW of each of the positioning posts 123. Each of the locking members 160 is engaged with each of the corresponding threads 1231 so that a head 161 of each of the locking members 160 is spaced from each of the corresponding positioning posts 123. By changing the position of the thread 1231 in the inner wall surface IW, the distance between the head 161 of each of the locking members 160 and each of the positioning posts 123 may be adjusted so as to adjust the degree to which the head 161 of each of the locking members 160 compresses each of the elastic members 170. That is, the lesser the distance between the head 161 of each of the locking members 160 and each of the positioning posts 123, the greater the deformation amount of each elastic member 170. Otherwise, the larger the distance between the head 161 of each of the locking members 160 and each positioning post 123, the lesser the deformation amount of each elastic member 170.

In an embodiment, the plurality of locking members 160 are respectively screwed to the threads 1231 of the corresponding plurality of positioning posts 123 with one or more preset torque values. The preset torque values may be determined according to the clamping force requirements of the fixed base 130 to clamp the ball head 141 and/or the material properties of the fixed base 130, the ball head 141, the positioning post 123, and the locking member 160. For example, the plurality of locking members 160 are screwed to the threads 1231 of the corresponding plurality of positioning posts 123 using an appropriate torque value between 2-4 kgf-cm (e.g., 3 kgf-m). Since the spacer 150 and the elastic member 170 are interposed between the locking member 160 and the positioning post 123 to provide a reaction force, by setting an appropriate torque value, it is possible to effectively prevent the locking member 160 from being excessively locked into the positioning post 123 to cause damage to the thread 1231 or the locking member 160 during the process of screwing the locking member 160 to the positioning post 123. Moreover, the reaction force of the spacer 150 and the elastic member 170 may still achieve an effective locking effect between the locking member 160 and the positioning post 123.

In another embodiment, the upper cover 120, the fixed base 130 and the rotating base 140 are made of plastic. The elastic member 170 may compensate for the clamping force lost due to the temperature variation or the aging of the universal platform so as to maintain the proper function of the rotating base 140.

The universal platform of the disclosure is adapted to connect the electronic equipment. Through the elastic force provided by the elastic member, the fixed base may press the rotating base to stabilize the position and deflection angle of the rotating base in the fixed base. When the clamping force of the fixed base declines under the environmental temperature difference and long-term extrusion, the elastic member may compensate for the clamping force lost by the fixed base after the material of the fixed base ages so as to prevent the rotating base from loosening from the fixed base.

In short, the disclosure combines a locking member, an elastic member, and a spacer between the fixed base and the upper cover and the fixed base is pushed to tighten the ball head of the rotating base through the elastic member.

Furthermore, the universal platform of the disclosure may achieve the purpose of compensating the clamping force by using the existing standard elastic members and locking members. The elastic force applied to the fixed base is consistent, so that the universal platform has a consistent angle adjustment sensation.

In addition, the universal platform of the disclosure has a self-adaptive clamping force, which does not use the size of the fixed base to control the clamping force and thus eliminates the uncertainty during production and assembly. Therefore, the disclosure may be widely used in smart home monitoring products and enterprise smart monitoring systems, such as smart smoke alarms, smart cameras, smart video phones, smart voice speakers, and the like.

What is claimed is:

1. A universal platform, comprising:
   a bottom base;
   an upper cover, disposed on the bottom base, and having a through hole and a plurality of positioning posts;
   a plurality of spacers respectively sleeved on the ends of the plurality of positioning posts;
   a fixed base, disposed between the upper cover and the bottom base, and having a concave aligned to the through hole to form a receiving space;
   a rotating base, disposed in the receiving space, and partially protruding outside of the through hole, wherein the rotating base has a ball head, the ball head fits in the receiving space and interferes with at least one of the upper cover and the fixed base, and the ball head is adapted to rotate in the receiving space;
   at least one locking member, connected to the upper cover through the fixed base; and
   at least one elastic member, disposed between the fixed base and the at least one locking member,
   wherein, the at least one elastic member is disposed between the at least one spacer and a head of the at least one locking member.

2. The universal platform according to claim 1, wherein the fixed base has a plurality of positioning holes for respectively accommodating the plurality of positioning posts so that an end of each positioning post protrudes through each of the positioning holes.

3. The universal platform according to claim 1, wherein the at least one locking member comprises a plurality of locking members respectively penetrating and connected to the plurality of positioning posts, and a gap is formed between each of the locking members and each of the corresponding spacers.

4. The universal platform according to claim 3, wherein the at least one elastic member comprises a plurality of elastic members respectively located in each corresponding gap and respectively pushes against each of the spacers and each of the locking members.

5. The universal platform according to claim 3, wherein each of the positioning posts has a thread formed on an inner wall surface of each of the positioning posts, and each of the locking members is engaged with each of the corresponding threads so that a head of each of the locking members is spaced from each of the corresponding positioning posts.

6. The universal platform according to claim 5, wherein the plurality of locking members are respectively screwed to the threads of the plurality of positioning posts with one or more preset torque values.

7. The universal platform according to claim 3, wherein each of the locking members and each of the corresponding positioning post are snap-fitted.

8. The universal platform according to claim 1, the upper cover, the fixed base and the rotating base are made of plastic.

\* \* \* \* \*